US012087492B2

(12) United States Patent
Takenaka et al.

(10) Patent No.: US 12,087,492 B2
(45) Date of Patent: *Sep. 10, 2024

(54) COMMON-MODE CHOKE COIL

(71) Applicant: Murata Manufacturing Co., Ltd., Kyoto-fu (JP)

(72) Inventors: Kazuhiko Takenaka, Nagaokakyo (JP); Shigeto Yamamoto, Nagaokakyo (JP); Ryota Hashimoto, Nagaokakyo (JP); Akio Igarashi, Nagaokakyo (JP); Yuki Kanbe, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,594

(22) Filed: Oct. 19, 2023

(65) Prior Publication Data

US 2024/0047121 A1 Feb. 8, 2024

Related U.S. Application Data

(63) Continuation of application No. 16/264,368, filed on Jan. 31, 2019, now Pat. No. 11,837,396.

(30) Foreign Application Priority Data

Feb. 5, 2018 (JP) ................................ 2018-018566
Oct. 12, 2018 (JP) ................................ 2018-193327

(51) Int. Cl.
*H01F 27/28* (2006.01)
*H01F 17/00* (2006.01)
(Continued)

(52) U.S. Cl.
CPC ......... *H01F 27/2823* (2013.01); *H01F 17/04* (2013.01); *H01F 27/29* (2013.01); *H01F 2017/0093* (2013.01)

(58) Field of Classification Search
CPC ................. H01F 27/2823; H01F 17/04; H01F 2017/0093
See application file for complete search history.

(56) References Cited

U.S. PATENT DOCUMENTS 6,144,280 A * 11/2000 Amada ................. H01F 27/292 336/205
2004/0263285 A1* 12/2004 Suzuki .................. H01F 41/082 333/185
(Continued)

FOREIGN PATENT DOCUMENTS

JP H10-64737 A 3/1998
JP 2002-093633 A 3/2002
(Continued)

OTHER PUBLICATIONS

An Office Action; "Notice of Reasons for Refusal," mailed by the Japanese Patent Office on Mar. 9, 2021, which corresponds to Japanese Patent Application No. 2018-193327 and is related to U.S. Appl. No. 16/264,368; with English language translation.
(Continued)

*Primary Examiner* — Malcolm Barnes
(74) *Attorney, Agent, or Firm* — Studebaker & Brackett PC

(57) ABSTRACT

A coil component includes a drum core that includes a winding core portion and a pair of flange portions formed at the ends of the winding core portion, electrodes that are included in the pair of flange portions, and first and second wires that are wound around the winding core portion and that include extended portions electrically connected to the electrodes. The flange portions are continuous with the winding core portion and have slopes that guide the extended portions to the electrodes.

19 Claims, 10 Drawing Sheets

(51) Int. Cl.
*H01F 17/04* (2006.01)
*H01F 27/29* (2006.01)

(56) References Cited

U.S. PATENT DOCUMENTS

| | | | | |
|---|---|---|---|---|
| 2016/0133377 | A1* | 5/2016 | Takagi | H01F 27/29<br>29/605 |
| 2016/0240305 | A1* | 8/2016 | Igarashi | H01F 27/292 |
| 2019/0148055 | A1* | 5/2019 | Moriya | H01F 27/292<br>336/83 |
| 2019/0172630 | A1* | 6/2019 | Asai | H01F 27/29 |
| 2019/0189337 | A1* | 6/2019 | Kawasaki | H01F 27/24 |

FOREIGN PATENT DOCUMENTS

| | | | | |
|---|---|---|---|---|
| JP | 2002-313646 | A | | 10/2002 |
| JP | 2009147158 | A | * | 7/2009 |
| JP | 2009-231547 | A | | 10/2009 |
| JP | 2014-075533 | A | | 4/2014 |
| JP | 2014-216347 | A | | 11/2014 |

OTHER PUBLICATIONS

An Office Action; "Notice of Reasons for Refusal," mailed by the Japanese Patent Office on Jun. 29, 2021, which corresponds to Japanese Patent Application No. 2018-193327 and is related to U.S. Appl. No. 16/264,368 with with English translation.

* cited by examiner

COMMON-MODE CHOKE COIL

CROSS-REFERENCE TO RELATED APPLICATIONS

This application is a Continuation of U.S. patent application Ser. No. 16/264,368 filed Jan. 31, 2019, which claims benefit of priority to Japanese Patent Application No. 2018-018566, filed Feb. 5, 2018, and to Japanese Patent Application No. 2018-193327, filed Oct. 12, 2018, the entire content of each is incorporated herein by reference.

BACKGROUND

Technical Field

The present disclosure relates to a common-mode choke coil.

Background Art

In the related art, there is known a common-mode choke coil in which a pair of wires are wound around a winding core portion of a drum core and in which terminals of the wires are electrically connected to electrode portions that are provided at flange portions of the drum core as described, for example, in Japanese Unexamined Patent Application Publication No. 2014-75533. In such a common-mode choke coil, extended wiring lines, which are terminals of wires, are electrically connected to electrodes provided at flange portions of a core.

In a common-mode choke coil such as that described above, extended portions (the extended wiring lines), which are terminals of wires, are electrically connected to electrodes of flange portions of a core. After the extended portions of the wires have been connected to the electrodes of the flange portions, although the extended portions connected to the electrodes are fixed in place, a stress may sometimes be applied to portions of the wires, the portions being located between a winding core portion and the electrodes, and as a result, the portions of the wires may sometimes be moved. Thus, there is a possibility that breakage of the wires will occur at the portions.

SUMMARY

The present disclosure provides a common-mode choke coil that suppresses occurrence of breakage of a wire.

A common-mode choke coil according to preferred embodiments of the present disclosure includes a core that includes a winding core portion and a pair of flange portions formed at ends of the winding core portion, electrodes that included in the pair of flange portions, and first and second wires that are wound around the winding core portion and that include extended portions electrically connected to the electrodes. The flange portions are continuous with the winding core portion and have slopes each of which guides a specific one of the extended portions to a specific one of the electrodes. With this configuration, the flange portions have the slopes that are continuous with the winding core portion and that guide the extended portions to the electrodes, so that movement of the wires is suppressed, and occurrence of breakage of the wires can be suppressed.

In the above-described common-mode choke coil, it is preferable that the pair of flange portions each have one of the slopes. With this configuration, the pair of flange portions each have one of the slopes, so that deformation of the extended portions of the first and second wires that are connected to the electrodes of the flange portions is suppressed, and occurrence of breakage of the first and second wires can be suppressed.

In the above-described common-mode choke coil, it is preferable that facing surfaces of the pair of flange portions that face each other have the slopes and that, when viewed in a direction in which the pair of flange portions are arranged, the first and second wires be hidden by end surfaces of the pair of flange portions that are opposite to the facing surfaces of the pair of flange portions. With this configuration, the first second wires are hidden by the end surfaces of the pair of flange portions that are opposite to the facing surfaces of the pair of flange portions when viewed in a direction in which the pair of flange portions are arranged, so that, for example, after the coil has been mounted on a substrate, the probability of a resin entering from the side of each of the flange portions and reaching the first and second wires when the resin or the like is molded around the periphery of the coil component is reduced. Here, if a mold resin reaches the first and second wires there is a possibility that the first and second wires will be pulled as a result of the mold resin expanding and contracting due to thermal shock, which in turn results in breakage of the first and second wires. Therefore, as described above, by reducing the probability of the mold resin reaching the first and second wires, the occurrence of breakage of the first and second wires is suppressed.

In the above-described common-mode choke coil, it is preferable that the slopes be hidden when viewed in a direction that is perpendicular to the direction in which the pair of flange portions are arranged and that is parallel to mounting surfaces of the electrodes. With this configuration, the slopes are hidden when viewed in a direction that is perpendicular to the direction in which the pair of flange portions are arranged and that is parallel to mounting surfaces of the electrodes, so that the exposure of the wires (the extended portions) in the same direction is reduced.

In the above-described common-mode choke coil, it is preferable that the extended portions be shaped so as to follow shapes of the slopes. With this configuration, the extended portions are shaped so as to follow shapes of the slopes, so that movement of the extended portions is suppressed, and occurrence of breakage of the wires (the extended portions) can be suppressed.

In the above-described common-mode choke coil, it is preferable that the slopes each have a groove in which one of the extended portions is fitted. With this configuration, the slopes each have a groove in which one of the extended portions is fitted, so that the extended portions are more reliably guided, thereby suppressing deformation of the extended portions, and occurrence of breakage of the wires (the extended portions) can be suppressed.

In the above-described common-mode choke coil, it is preferable that an inclination angle of each of the slopes be within a range of about 5 degrees or larger to about 20 degrees or smaller. With this configuration, by setting the inclination angle of each of the slopes to be within a range of about 5 degrees or larger to about 20 degrees or smaller (i.e. from about 5 degrees to about 20 degrees), separation of the wires from the slopes can be suppressed, and the load that is applied to the wires can be reduced.

In a common-mode choke coil according to preferred embodiments of the present disclosure, occurrence of breakage of the wires can be suppressed.

Other features, elements, characteristics and advantages of the present disclosure will become more apparent from the following detailed description of preferred embodiments of the present disclosure with reference to the attached drawings.

DETAILED DESCRIPTION

First Embodiment

Figure 1:
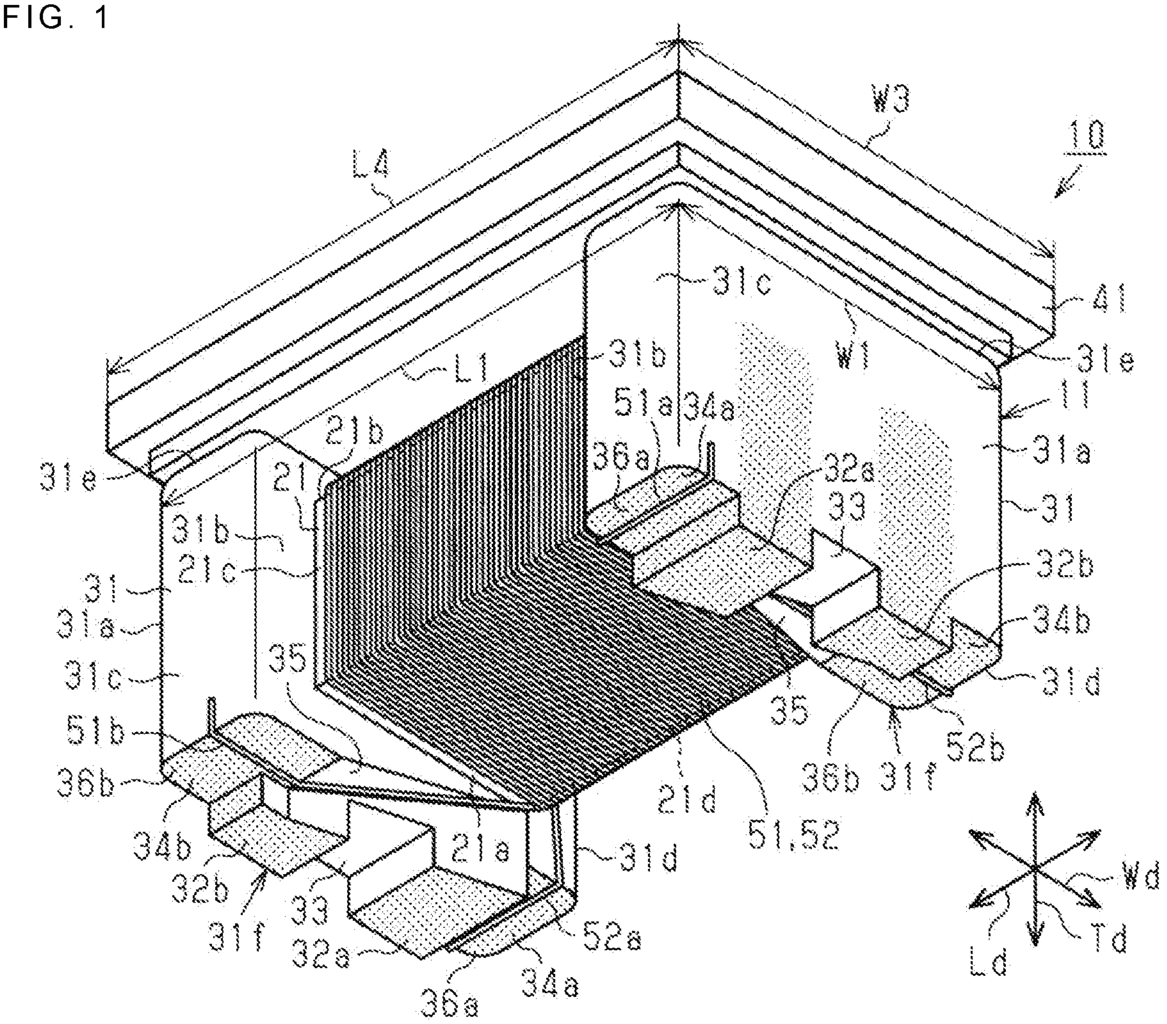
FIG. 1 is a perspective view of a coil component according to a first embodiment of the present disclosure.

A first embodiment of the present disclosure will be described below. Note that some components are illustrated in an enlarged manner in the accompanying drawings for ease of understanding. The dimensional ratios of the components may sometimes be different from the dimensional ratios of actual components or may sometimes be different from the dimensional ratios of the components illustrated in the drawings.

As illustrated in FIG. 1, a coil component 10 is a common-mode choke coil. The coil component 10 includes a drum core 11, a plate core 41 that has a substantially plate-like shape and that is bonded to the drum core 11, and first and second wires 51 and 52 that are wound around the drum core 11.

As illustrated in FIG. 1, the drum core 11 includes a winding core portion 21 that has a substantially rectangular parallelepiped shape and a pair of first and second flange portions 31 that are formed at the ends of the winding core portion 21. The winding core portion 21 and the pair of flange portions 31 are integrally formed.

Here, in the present specification, as illustrated in FIG. 1 to FIG. 4, a direction (juxtaposition direction) in which the pair of flange portions 31 are arranged side by side is defined as a "lengthwise direction Ld". A direction that is perpendicular to a main surface of the plate core 41 and in which the plate core 41 and each of the flange portions 31 of the drum core 11 are in contact with each other is defined as a "heightwise direction (thicknesswise direction) Td". A direction that is perpendicular to both the "lengthwise direction Ld" and the "heightwise direction Td" is defined as a "widthwise direction Wd". The drum core 11 according to the first embodiment is made of a magnetic material such as NiCuZn ferrite.

Figure 2:
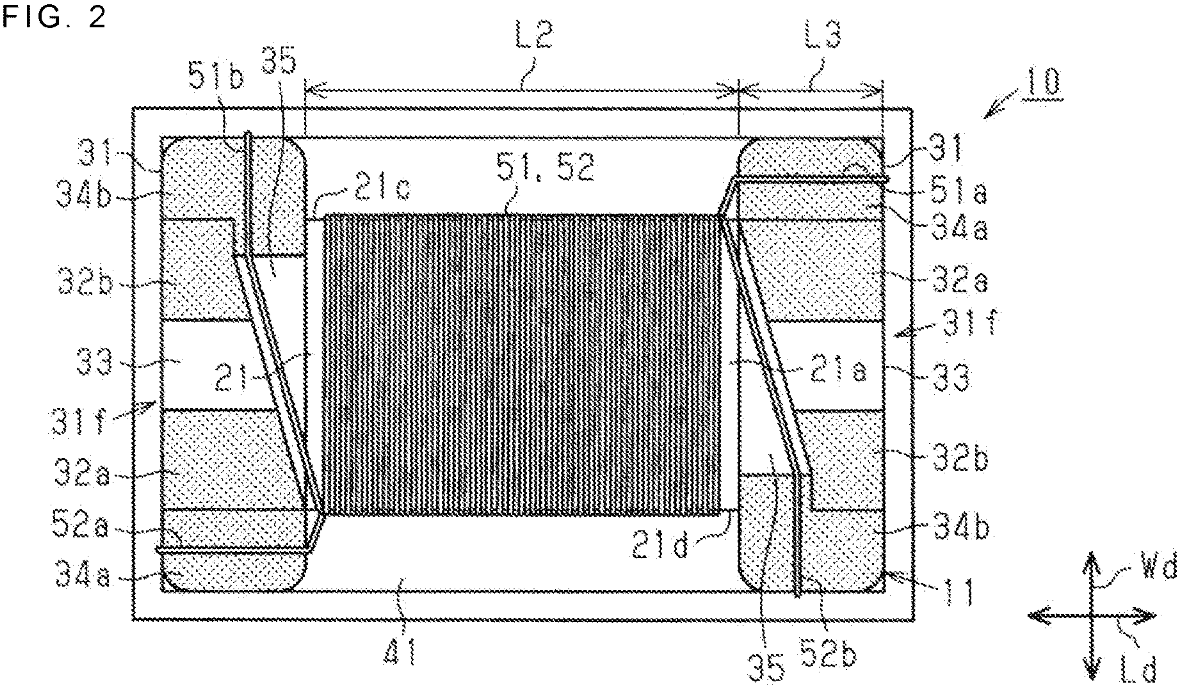
FIG. 2 is a bottom view of the coil component according to the first embodiment.

As illustrated in FIG. 1 and FIG. 2, the first and second wires 51 and 52 are wound around the winding core portion 21. For example, the winding core portion 21 is formed in a substantially rectangular parallelepiped shape extending in the lengthwise direction Ld. The central axis of the winding core portion 21 extends approximately parallel to the lengthwise direction Ld. The winding core portion 21 has a pair of main surfaces 21*a* and 21*b* that oppose each other in the heightwise direction Td and a pair of side surfaces 21*c* and 21*d* that oppose each other in the widthwise direction Wd. Regarding the main surfaces 21*a* and 21*b*, the main surface 21*a* is the surface that is farther from the plate core 41 in the heightwise direction Td, and the main surface 21*b* is the surface that is closer to the plate core 41 in the heightwise direction Td.

Figure 5A:
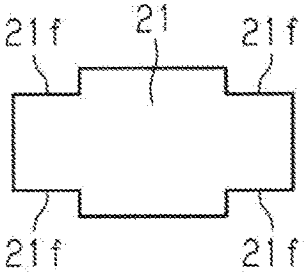
FIGS. 5A to 5D are cross-sectional views illustrating examples of the shape of a drum core according to the first embodiment.
Figure 5B:
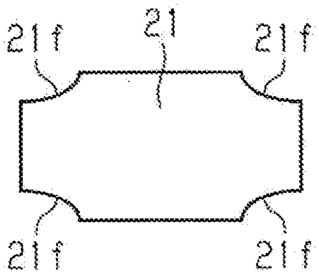
Figure 5C:
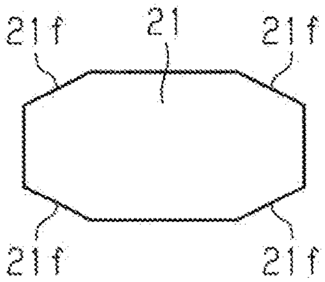
Figure 5D:
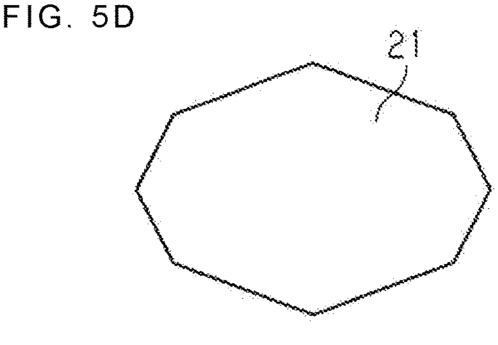

Note that, in the present specification, the term "substantially rectangular parallelepiped shape" includes a substantially rectangular parallelepiped shape having a corner portion or a ridge line portion that is chamfered, a substantially rectangular parallelepiped shape having a corner portion or a ridge line portion that is suitably rounded so as to have a substantially round-chamfered surface, and a substantially rectangular parallelepiped shape having a corner portion or a ridge line portion that is recessed. In addition, irregularities may be formed on portions of or the entire main and side surfaces. FIGS. 5A to 5D illustrate examples of the cross-sectional shape of the winding core portion 21. In the winding core portion 21 illustrated in FIG. 5A, corner portions 21*f* each have an angular recess. In the winding core portion 21 illustrated in FIG. 5B, each of the corner portions 21*f* is round chamfered so as to have a substantially curved-surface shape. In the winding core portion 21 illustrated in FIG. 5C, each of the corner portions 21*f* is chamfered to have a substantially chamfered shape. The winding core portion 21 illustrated in FIG. 5D is formed so as to have a substantially octagonal (substantially non-regular octagonal) cross-sectional shape. With any one of these cross-sectional shapes, when the wires 51 and 52, which will be described later, are wound around the winding core portion 21, each of the wires 51 and 52 forms an obtuse angle at each of the corner portions 21*f*, whereas in the case where the winding core portion 21 has a substantially rectangular cross section (has about 90-degree corners), each of the wires 51 and 52 does not form an obtuse angle at each of the corner portions 21*f*. Thus, compared with the case where the winding core portion 21 has a substantially rectangular shape (substantially quadrangular shape), the wires 51 and 52 are less likely to be thickly wound around the winding core portion 21 and can be more closely wound around the winding core portion 21.

As illustrated in FIG. 1 to FIG. 4, the pair of flange portions 31 are each formed in a substantially rectangular parallelepiped shape that is short in the lengthwise direction Ld. Each of the flange portions 31 is formed so as to project around the winding core portion 21 in the heightwise direction Td and the widthwise direction Wd. More specifically, when viewed in the lengthwise direction Ld, the planar shape of each of the flange portions 31 projects from the winding core portion 21 in the heightwise direction Td and the widthwise direction Wd.

Each of the flange portions 31 has a pair of main surfaces 31*a* and 31*b* that oppose each other in the lengthwise direction Ld, a pair of side surfaces 31*c* and 31*d* that oppose each other in the widthwise direction Wd, and a pair of side surfaces 31*e* and 31*f* that oppose each other in the heightwise direction Td. The main surfaces 31*a* of the flange portions 31 face away from the winding core portion 21 in the lengthwise direction Ld (face the outside of the drum core 11 in the lengthwise direction Ld). Here, the main surfaces 31*a* of the flange portions 31 correspond to end surfaces of the flange portions 31. The main surfaces 31*b* of the flange portions 31 face the winding core portion 21 in the lengthwise direction Ld (face the inside of the drum core 11 in the lengthwise direction Ld). In other words, the main surfaces 31*b* of the flange portions 31 correspond to facing surfaces that face each other.

The side surface 31*f* of each of the flange portions 31 that faces a substrate (not illustrated) when the coil component 10 is mounted onto the substrate has two mounting surfaces 32*a* and 32*b* that are spaced apart from each other, a center recess 33 that isolates the two mounting surfaces 32*a* and 32*b* from each other, and outer recesses 34*a* and 34*b* that are located on opposite sides of the center recess 33 and each of which is adjacent to one of the mounting surfaces 32*a* and 32*b*. The mounting surfaces 32*a* and 32*b* project in the heightwise direction Td further than the center recess 33 and the outer recesses 34*a* and 34*b* do. In the first embodiment, the distance from each of the mounting surfaces 32*a* and 32*b* to the main surface 21*a* of the winding core portion 21 is set to about 0.1 mm to about 0.5 mm.

The flange portions 31 further include slopes 35. Each of the slopes 35 is an inclined surface that has a substantially linear shape and that continuously extends from an end portion of the main surface 21*a* in the axial direction of the winding core portion 21 to the outer recess 34*b* of the corresponding flange portion 31 while having substantially no step. In the first embodiment, the inclination angle of each of the slopes 35 is set within a range of about 5 degrees or larger to about 20 degrees or smaller (i.e., from about 5 drees to about 20 degrees) with respect to the main surface 21*a* of the winding core portion 21 in the widthwise direction Wd, and it is particularly preferable that the inclination angle of each of the slopes 35 be set within a range of about 10 degrees or larger to about 15 degrees or smaller. Note that, in FIG. 1 to FIG. 4, the inclination angle of each of the slopes 35 is set to about 14 degrees. Here, in that case where the inclination angle of each of the slopes 35 is small, the wires 51 and 52 are likely to be separated from the slopes 35, and in the case where the inclination angle of each of the slopes 35 is large, a load is likely to be applied to the wires 51 and 52 after pressure bonding has been performed. By setting the inclination angle of each of the slopes 35 to be within one of the above-mentioned ranges, separation of the wires 51 and 52 from the slopes 35 can be suppressed, and the load that is applied to the wires 51 and 52 can be reduced.

Figure 3:
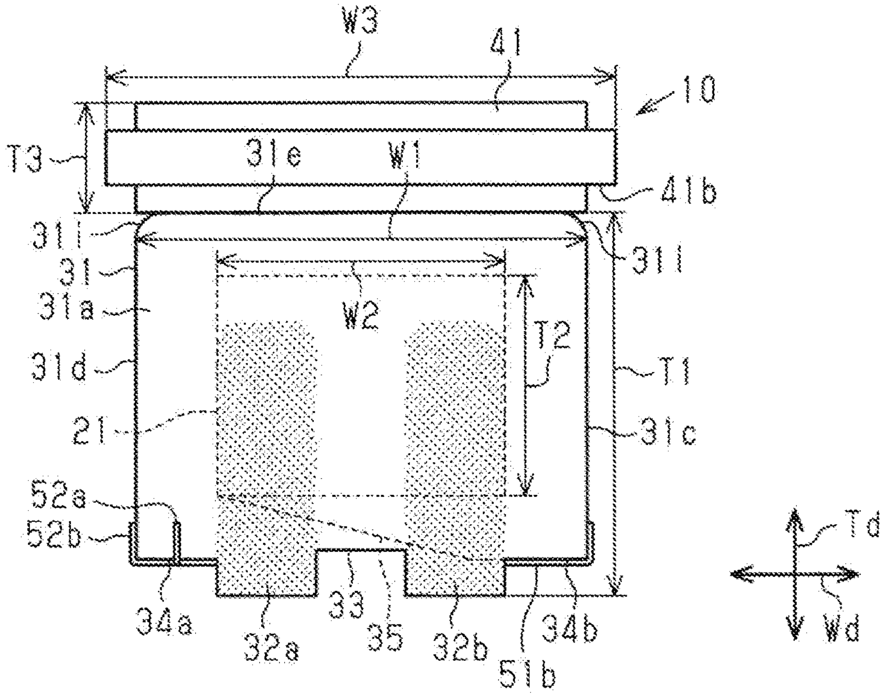
FIG. 3 is a side view of the coil component according to the first embodiment.

As illustrated in FIG. 3, when each of the flange portions 31 is viewed from the side (when each of the flange portions 31 is viewed in the lengthwise direction Ld, which is the juxtaposition direction of the flange portions 31), each of the slopes 35 is located at a position at which the slope 35 is hidden by the main surface 31*a* of the corresponding flange portion 31. In other words, each of the slopes 35 is positioned closer to the winding core portion 21 than the corresponding center recess 33 is in the heightwise direction Td. In addition, when viewed in the juxtaposition direction of the flange portions 31, the first and second wires 51 and 52 are hidden by the main surfaces 31*a* that are the end surfaces of the flange portions 31 opposite the main surfaces 31*b*, which are the facing surfaces of the flange portions 31. Thus, for example, a resin that is molded can be prevented from coming into contact with the first and second wires 51 and 52, and even if an impact is applied to the first and second wires 51 and 52, or even if the mold resin expands and contracts, the first and second wires 51 and 52 will not be pulled, so that breakage of the first and second wires 51 and 52 can be prevented. Furthermore, each of the slopes 35 is hidden when viewed in a direction parallel to the mounting surfaces 32*a* and 32*b*. By employing such a configuration, the exposure of the wires 51 and 52 (the extended portions 51*b* and 52*b*, which will be described later) in the same direction can be reduced.

Each of the slopes 35 is formed in a shape having a width that gradually increases from the side of the winding core portion 21 to the side of the corresponding flange portion 31 (the corresponding outer recess 34*b*). The first flange portion 31 includes electrodes 36*a* and 36*b*. The electrode 36*a* is formed on the mounting surface 32*a* and the outer recess 34*a*, and the electrode 36*b* is formed on the mounting surface 32*b* and the outer recess 34*b*. More specifically, the electrode 36*a* is formed so as to extend over the mounting surface 32*a* and the outer recess 34*a*, which are adjacent to each other, and the electrode 36*b* is formed so as to extend over the mounting surface 32*b* and the outer recess 34*b*, which are adjacent to each other. In addition, the mounting surfaces 32*a* and 32*b* are electrically disconnected from each other by the corresponding center recess 33. As a result, the two electrodes 36*a* and 36*b* are formed on the first flange portion 31.

In the second flange portion 31, a terminal electrode 36*a* is formed on the mounting surface 32*a* and the outer recess 34*a*, and a terminal electrode 36*b* is formed on the mounting surface 32*b* and the outer recess 34*b*. More specifically, the electrode 36*a* is formed so as to extend over the mounting surface 32*a* and the outer recess 34*a*, which are adjacent to each other, and the electrode 36*b* is formed so as to extend over the mounting surface 32*b* and the outer recess 34*b*, which are adjacent to each other. In addition, the mounting surfaces 32*a* and 32*b* are electrically disconnected from each other by the corresponding center recess 33. As a result, the two electrodes 36*a* and 36*b* are formed on the second flange portion 31.

In the widthwise direction Wd, the electrode 36*a* of the first flange portion 31 is located on the side opposite to the side on which the electrode 36*a* of the second flange portion 31 is located. In the widthwise direction Wd, the electrode 36*b* of the first flange portion 31 is located on the side opposite to the side on which the electrode 36*b* of the second flange portion 31 is located. As described above, each of the electrodes 36*b* is located on the side on which the corresponding outer recess 34*b* is formed, that is, the side on which the terminal end of the corresponding slope 35 is present. Note that the electrodes 36*a* and 36*b* of the flange portions 31 are each indicated by a dot pattern (an orange peel pattern) in the drawings. Extended portions 51*a*, 51*b*, 52*a*, and 52*b* of the first and second wires 51 and 52, which will be described later, are electrically connected to the electrodes 36*a* and 36*b*.

Figure 4:
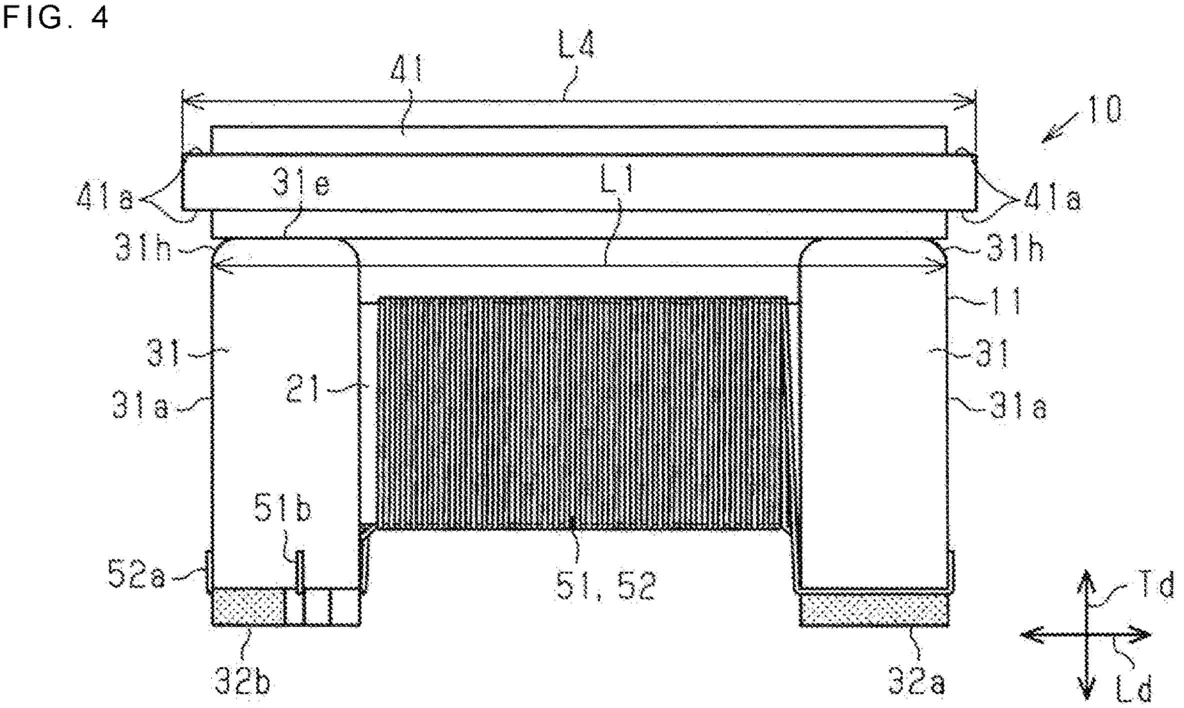
FIG. 4 is a front view of the coil component according to the first embodiment.
Figure 7A:
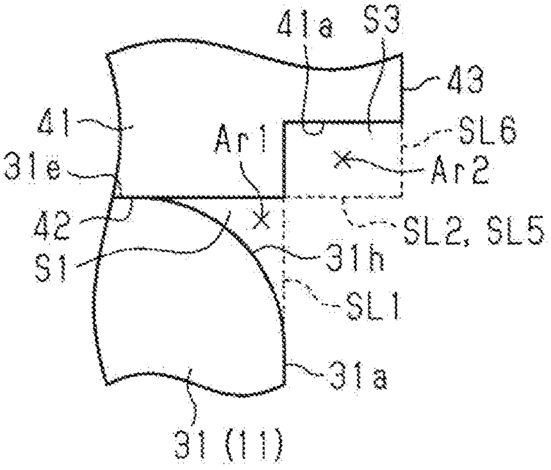
FIGS. 7A and 7B are diagrams illustrating ridge line portions of the flange portions and ridge line portions of a plate core according to the first embodiment.

As illustrated in FIG. 3 and FIG. 4, ridge line portions 31*h* and 31*i* of the flange portions 31 that are formed around the side surfaces 31*e*, which are opposite to the surfaces of the flange portions 31 on which the electrodes 36*a* and 36*b* are formed, are each round chamfered so as to have a substantially curved-surface shape. More specifically, as illustrated in FIG. 7A, each of the ridge line portions 31*h* has a shape that is more recessed toward the center of the first flange portion 31 than an imaginary ridge line portion at which an extended plane SL1 that passes over and extends along the main surface 31*a* of the first flange portion 31 and an extended plane SL2 that passes over and extends along the side surface 31*e* of the first flange portion 31 cross each other. In other words, each of the ridge line portions 31*h* of the first flange portion 31 is more recessed toward the center of the first flange portion 31 than that in the case where each of the ridge line portions 31*h* forms 90 degrees in its cross-section.

Figure 7B:
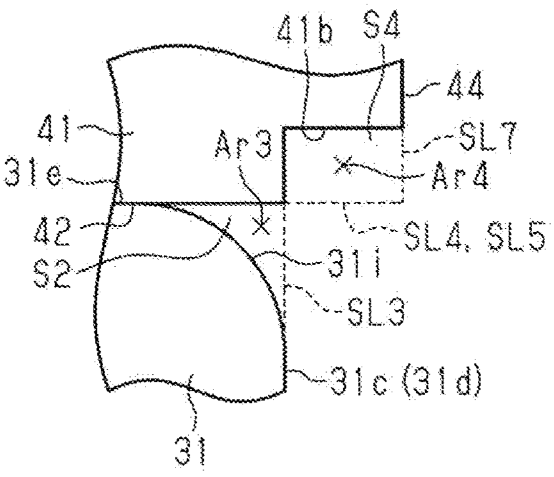

As illustrated in FIG. 7B, each of the ridge line portions 31*i* has a shape that is more recessed toward the center of the second flange portion 31 than an imaginary ridge line portion defined based on an extended plane SL3 that passes over and extends along the side surfaces 31*c* and 31*d* of the second flange portion 31 and an extended plane SL4 that passes over and extends along the side surface 31*e* of the second flange portion 31. In other words, each of the ridge line portions 31*i* of the second flange portion 31 is more recessed toward the center of the second flange portion 31 than that in the case where each of the ridge line portions 31*i* has a sharp corner. The radius of curvature of each of the ridge line portions 31*h* and 31*i* according to the first embodiment is set to, for example, about 30 μm or more and about 100 μm or less (i.e., from about 30 μm to about 100 μm).

As described above, the ridge line portions 31*h* and 31*i* are formed so as to be recessed, so that spaces S1 and S2 are formed at the ridge line portions 31*h* and 31*i*. Thus, in the case where an adhesive (described later) that is applied to the flange portions 31 when the coil component 10 is manufactured flows, the spaces S1 and S2 serve as accumulation portions in which the adhesive accumulates, and accordingly, the flow of the adhesive to the outside can be suppressed. Note that it is not necessary for the adhesive to accumulate in the spaces S1 and S2, which serve as the accumulation portions.

A length dimension L1 of the drum core 11, which is configured as described above, in the lengthwise direction Ld is set within a range of about 1.2 mm to about 4.5 mm. A height dimension T1 of the drum core 11 in the heightwise direction Td (the height dimension of each of the flange portions 31 from the mounting surfaces 32*a* and 32*b* to the side surface 31*e* in the heightwise direction Td) is set within a range of about 0.5 mm to about 2.1 mm. A width dimension W1 of the drum core 11 in the widthwise direction Wd (the width dimension of each of the flange portions 31 in the widthwise direction Wd) is set within a range of about 1.0 mm to about 3.2 mm.

As illustrated in FIG. 1 to FIG. 4, for example, the plate core 41 is adhered and fixed onto the pair of flange portions 31 with the adhesive so as to extend over the pair of flange portions 31. The plate core 41 can be made of a magnetic material or a non-magnetic material. By providing the plate core 41, when the coil component 10 is mounted onto a substrate, the coil component 10 can be easily suctioned by a suction nozzle of an automatic placement machine. In the case where the plate core 41 is made of a magnetic material, such as ferrite, a closed magnetic circuit can be formed by the drum core 11, which is also made of ferrite, and the plate core 41, and thus, for example, reduction in leakage flux can be expected.

A length dimension L4 of the plate core 41 according to the first embodiment in the lengthwise direction Ld is slightly larger than the length dimension L1 of the drum core 11. A height dimension T3 of the plate core 41 in the heightwise direction Td is set within a range of about 0.15 mm to about 1.0 mm. A width dimension W3 of the plate core 41 in the widthwise direction Wd is slightly larger than the width dimension W1 of the drum core 11 (each of the flange portions 31).

Changes in an L value due to the difference between the length dimension L4 of the plate core 41 and the length dimension L1 of the drum core 11 will now be described. As illustrated in the following Table 1 and Table 2, the amount of change in the L value and the rate of change (%) of the L value when the displacement amount of the drum core 11 with respect to the plate core 41 in the lengthwise direction Ld is varied were determined in three cases, which are a case in which the length dimension L4 of the plate core 41 is set to be 0.1 mm shorter than the length dimension L1 of the drum core 11 ("−0.1" in Table 1), a case in which the length dimension L4 of the plate core 41 is set to be equal to the length dimension L1 of the drum core 11, and a case in which the length dimension L4 of the plate core 41 is set to be 0.1 mm longer than the length dimension L1 of the drum core 11 ("0.1" in Table 1). Regarding the displacement amount of the drum core 11 in the lengthwise direction Ld, a case in which the drum core 11 is not displaced and a case in which the drum core 11 is displaced by 0.1 mm from a predetermined position (where the drum core 11 is not displaced) are illustrated in Table 1 and Table 2. In the latter case, each of the pair of flange portions 31 is displaced by 0.1 mm, that is, the total displacement amount is 0.2 mm, and thus, the value "0.2" is illustrated in Table 1 and Table 2.

TABLE 1

| | | Length Dimension of Plate Core with respect to Length Dimension of Drum Core [mm] | | |
|---|---|---|---|---|
| | | −0.1 | 0 | 0.1 |
| Displacement Amount of Drum Core with respect to Plate Core in Lengthwise Direction Ld [mm] | 0 | 42.03 [μH] | 43.82 [μH] | 43.92 [μH] |
| | 0.2 | 41.24 [μH] | 42.73 [μH] | 43.18 [μH] |

TABLE 2

| | | Length Dimension of Plate Core with respect to Length Dimension of Drum Core [mm] | | |
|---|---|---|---|---|
| | | −0.1 | 0 | 0.1 |
| Displacement Amount of Drum Core with respect to Plate Core in Lengthwise Direction Ld [mm] | 0 | 95.9% | 100.0% | 100.2% |
| | 0.2 | 96.5% | 100.0% | 101.1% |

As seen from Table 1 and Table 2, in the case where the length dimension L4 of the plate core 41 is set to be longer than the length dimension L1 of the drum core 11, there is only a small change in the L value even when the drum core 11 and the plate core 41 are displaced relative to each other in the lengthwise direction Ld. Thus, as described above, by setting the length dimension L4 of the plate core 41 to be longer than the length dimension L1 of the drum core 11 or by setting the width dimension W3 of the plate core 41 to be longer than the width dimension W1 of the drum core 11, even if the length dimension L4 of the plate core 41 is longer than the length dimension L1 of the drum core 11 or the width dimension W3 of the plate core 41 is longer than the width dimension W1 of the drum core 11 within a range of tolerance, a sufficient contact area between the drum core 11 (the flange portions 31) and the plate core 41 can be ensured, and thus, variations in the L value due to the tolerance can be reduced. As illustrated in FIG. 3 and FIG. 4, ridge line portions 41*a* and 41*b* of the plate core 41 each have a substantially recessed shape (a cutout shape).

More specifically, as illustrated in FIG. 7A, each of the ridge line portions 41*a* has a shape that is more recessed toward the center of the plate core 41 than an imaginary ridge line portion defined based on an extended plane SL5 that passes over and extends along a main surface 42 of the plate core 41 and an extended plane SL6 that passes over and extends along an end surface 43 of the plate core 41. In other words, each of the ridge line portions 41*a* of the plate core 41 is shaped to be more recessed toward the center of the plate core 41 than that in the case where each of the ridge line portions 41*a* has a sharp corner.

As illustrated in FIG. 7B, each of the ridge line portions 41*b* has a shape that is more recessed toward the center of the plate core 41 than an imaginary ridge line portion at which the extended plane SL5 that passes over and extends along the main surface 42 of the plate core 41 and an extended plane SL7 that passes over and extends along a side surface 44 of the plate core 41 cross each other. In other words, each of the ridge line portions 41*a* of the plate core 41 is more recessed toward the center of the plate core 41 than that in the case where each of the ridge line portions 41*a* forms 90 degrees in its cross-section.

As described above, the ridge line portions 41*a* and 41*b* are formed so as to have a substantially recessed shape, so that spaces S3 and S4 are formed at the ridge line portions 41*a* and 41*b*. Thus, in the case where the adhesive flows, the spaces S3 and S4 serve as accumulation portions in which the adhesive accumulates, and accordingly, the flow of the adhesive to the outside can be suppressed. Note that it is not necessary for the adhesive to accumulate in the spaces S3 and S4, which serve as the accumulation portions.

It is preferable that accumulation regions Ar1 and Ar3 of the spaces S1 and S2 formed at the ridge line portions 31*h* and 31*i* be larger than accumulation regions Ar2 and Ar4 of the spaces S3 and S4 formed at the ridge line portions 41*a* and 41*b*, respectively. The accumulation regions Ar1 to Ar4 respectively correspond to the areas of the spaces S1 to S4 when the drum core 11 and the plate core 41 are cut in a direction including the ridge line portions 31*h*, 31*i*, 41*a*, and 41*b*. Note that the ridge line portions 31*h*, 31*i*, 41*a*, and 41*b* may be formed beforehand into the shapes illustrated in the drawings or may be formed by after processing, such as grinding. By employing such a configuration, a large amount of the adhesive can be guided to the spaces on the side of the drum core 11 (the flange portions 31). Since the length dimension L4 of the plate core 41 is longer than the length dimension L1 of the drum core 11, by guiding the adhesive to the side of the drum core 11, unintentional increase in the length dimension of the coil component 10 can be suppressed. In addition, since the width dimension W3 of the plate core 41 is longer than the width dimension W1 of each of the flange portions 31 of the drum core 11, by guiding the adhesive to the side of the drum core 11, unintentional increase in the width dimension of the coil component 10 can be suppressed.

The first and second wires 51 and 52 are covered electric wires and are wound around the winding core portion 21 in the same winding direction so as to form a coil conductor. For example, covered electric wires each having a diameter within a range of about 15 μm to about 80 μm can be used as the first and second wires 51 and 52, and as an example, covered electric wires each having a diameter of about 15 μm are used. The first and second wires 51 and 52 are wound around the winding core portion 21 so as to have the same number of turns. In the first embodiment, for example, the first and second wires 51 and 52 are wound around the winding core portion 21 such that the number of turns of each of the first and second wires 51 and 52 is about 16 turns (about 32 turns in total).

The extended portion 51*a*, which is one of the terminals of the first wire 51, is connected to the electrode 36*a* of the first flange portion 31, and the extended portion 51*b*, which is the other of the terminals of the first wire 51, is connected to the electrode 36*b* of the second flange portion 31. In this case, the extended portion 51*b* is shaped so as to follow the shape of a corresponding one of the slopes 35.

The extended portion 52*a*, which is one of the terminals of the second wire 52, is connected to the electrode 36*b* of the first flange portion 31, and the extended portion 52*b*, which is the other of the terminals of the second wire 52, is connected to the electrode 36*a* of the second flange portion 31. In this case, the extended portion 52*b* is shaped so as to follow the shape of a corresponding one of the slopes 35.

A method of manufacturing the coil component 10 configured as described above will now be described.

First, the drum core 11 is formed by using a metal mold.

Next, the electrodes 36*a* and 36*b* are formed on the mounting surfaces 32*a* and 32*b* and the outer recesses 34*a* and 34*b* of the flange portions 31. The electrodes 36*a* and 36*b* can be formed by performing, for example, screen printing or dry plating using silver (Ag) or the like on the mounting surfaces 32*a* and 32*b* and the outer recesses 34*a* and 34*b* of the flange portions 31. For example, the electrodes 36*a* and 36*b* are formed by performing screen printing twice on the mounting surfaces 32*a* and 32*b* and the outer recesses 34*a* and 34*b* or by using both screen printing and dry plating. In these cases, the thicknesses of the electrodes 36*a* and 36*b* on the mounting surfaces 32*a* and 32*b* and the outer recesses 34*a* and 34*b* are each set to about 0.1 μm to about 0.5 μm in the case of dry plating and are each set to about 10 μm to about 30 μm in the case of screen printing.

Next, the electrodes 36*a* and 36*b* are formed on the main surfaces 31*a* (end surfaces) of the flange portions 31. These electrodes 36*a* and 36*b* are formed so as to be electrically connected to the electrodes 36*a* and 36*b* that have been formed on the mounting surfaces 32*a* and 32*b* and the outer recesses 34*a* and 34*b*. The electrodes 36*a* and 36*b* can be formed by performing, for example, screen printing or dry plating using Ag on the main surfaces 31*a* (end surfaces) of the flange portions 31. In this case, the thicknesses of each of the electrodes 36*a* and 36*b* on the main surfaces 31*a* (end surfaces) are each set to about 0.1 μm to about 0.5 μm in the case of dry plating and are each set to about 10 μm to about 30 μm in the case of screen printing.

Figure 6:
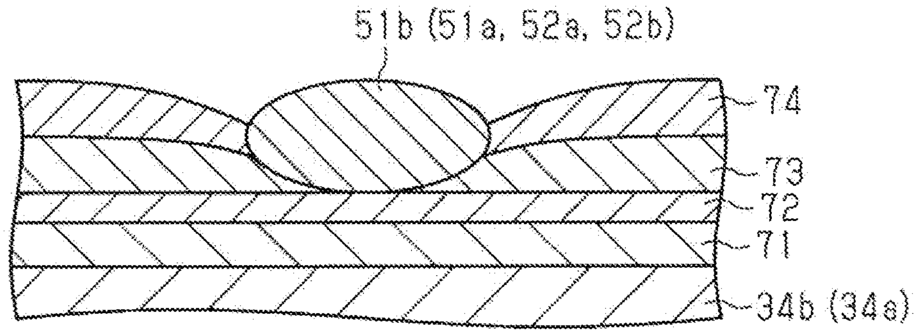
FIG. 6 is a sectional view illustrating a plating structure of flange portions of the drum core according to the first embodiment.

Subsequently, plating treatments are performed. In the first embodiment, plating treatments are performed in the order of copper (Cu) plating, nickel (Ni) plating, and tin (Sn)

plating. In other words, as illustrated in FIG. 6, the plating treatments are performed on the outer recesses 34*a* and 34*b* of the flange portions 31 such that three layers, which are a Cu plating layer 72, a Ni plating layer 73, and a Sn plating layer 74, are sequentially formed on a Ag layer 71, which forms the electrodes 36*a* and 36*b*. In addition, another Cu plating layer may be formed between the Ni plating layer 73 and the Sn plating layer 74. The thicknesses of the layers formed through the plating treatments are each set within a range of about 0.5 μm to about 15 μm, and it is preferable that each of the thicknesses be set within a range of about 1 μm to about 10 μm. Note that gold (Au) may be used instead of Sn.

Next, the first and second wires 51 and 52 are prepared. For example, a wire containing Cu, such as a CuNi alloy wire containing Ni, can be used as each of the first and second wires 51 and 52. A resin material such as imide-modified polyurethane can be used for the covering of the first and second wires 51 and 52. As a result, occurrence of Cu leaching in the wires 51 and 52 due to the Sn plating layer 74 when thermocompression bonding is performed can be suppressed.

Subsequently, the first and second wires 51 and 52 are wound around the winding core portion 21.

Then, the covering of each of the extended portions 51*a*, 51*b*, 52*a*, and 52*b* of the first and second wires 51 and 52 is removed as necessary. The method of removing the covering is not particularly limited, and for example, the covering can be removed by using laser. In addition, in the case where it is not necessary to remove the covering because of, for example, the material of the covering, this process can be omitted.

Next, in a state where the extended portions 51*a*, 51*b*, 52*a*, and 52*b* of the first and second wires 51 and 52 are pulled in a direction parallel to the surfaces of the outer recesses 34*a* and 34*b*, the extended portions 51*a*, 51*b*, 52*a*, and 52*b* are electrically connected to the electrodes 36*a* and 36*b* formed on the outer recesses 34*a* and 34*b* by for example, applying pressure to the extended portions 51*a*, 51*b*, 52*a*, and 52*b*. The method of applying pressure is not particularly limited, and for example, thermocompression bonding using a heater chip can be employed. In this case, the amount of deformation of each of the wires 51 and 52 (the extended portions 51*a*, 51*b*, 52*a*, and 52*b*) when pressure is applied thereto is less than about 50%. It is preferable that thermocompression bonding using a heater chip be performed such that each of the extended portions 51*a*, 51*b*, 52*a*, and 52*b* of the wires 51 and 52 is in contact with the Cu plating layer 72 by crossing at least the Sn plating layer 74 and the Ni plating layer 73. In this case, even if Cu leaching occurs, Cu can be supplied from the Cu plating layer 72 to the wires 51 and 52, and thus, decrease in the thickness of each of the wires 51 and 52 is suppressed, so that occurrence of breakage of the wires 51 and 52 is suppressed.

Subsequently, end portions of the extended portions 51*a*, 51*b*, 52*a*, and 52*b* of the first and second wires 51 and 52 are cut off. In this case, it is preferable that the end portions of the extended portions 51*a*, 51*b*, 52*a*, and 52*b* of the first and second wires 51 and 52 be cut off in a state where these end portions extend from (project from) any one of the main surfaces 31*a* and the side surfaces 31*c* and 31*d*. It is further preferable that end portions of the extended portions 51*a*, 51*b*, 52*a*, and 52*b* that are formed after the cutting operation has been performed be shaped so as to follow the shape of any one of the main surfaces 31*a* and the side surfaces 31*c* and 31*d*. As described above, since the end portions of the first and second wires 51 and 52 extending from any one of the main surfaces 31*a* and the side surfaces 31*c* and 31*d* are cut off, the cutting operation is easily performed outside of the drum core 11. In addition, the end portions of the extended portions 51*a*, 51*b*, 52*a*, and 52*b* after the cutting operation has been performed are shaped so as to follow the shape of the drum core 11, so that the influence of the extended portions 51*a*, 51*b*, 52*a*, and 52*b* on the dimensions of the entire coil component 10 can be reduced. Furthermore, the end portions of the extended portions 51*a*, 51*b*, 52*a*, and 52*b* extend to the main surfaces 31*a* and the side surfaces 31*c* and 31*d*, so that the wires 51 and 52 are not in contact with the Sn plating layer 74 on these surfaces.

Next, the plate core 41 is bonded to the drum core 11. More specifically, a resin serving as an adhesive is applied to the side surfaces 31*e* of the flange portions 31 by dispensing or pin transfer. Then, the plate core 41 are brought into contact with the side surfaces 31*e*, to which the resin has been applied, and can be bonded to the side surfaces 31*e*. In this case, since the resin serving as an adhesive is provided between the drum core 11 and the plate core 41, the characteristics of the L value of the coil may deteriorate compared with the case where the drum core 11 and the plate core 41 are brought into close contact with each other without a gap therebetween. Thus, by using a magnetic resin that is obtained by mixing a magnetic metal powder, such as a metal powder or a ferrite powder, into a resin as the resin serving as an adhesive, reduction in the L value of the coil can be suppressed. In this case, it is desirable that the relative permeability of the magnetic resin be about 2 to about 20.

Advantageous effects of the structure of the above-described coil component 10 will now be described.

In the coil component 10 according to the first embodiment, each of the slopes 35 is formed on the side on which the main surface 31*b* of the corresponding flange portion 31 is present, and the extended portions 51*b* and 52*b* are guided along the slopes 35, that is, the extended portions 51*b* and 52*b* are each shaped so as to follow the shape of the corresponding slope 35. As a result, deformation of the extended portions 51*b* and 52*b* is suppressed. In addition, the slopes 35 are hidden by the flange portions 31 (the main surfaces 31*a*) when viewed from the side, and accordingly, the extended portions 51*b* and 52*b* are also hidden by the flange portions 31 (main surfaces 31*a*) when viewed from the side. As a result, for example, a resin that is molded can be prevented from coming into contact with the first and second wires 51 and 52, and even if an impact is applied to the first and second wires 51 and 52, or even if the mold resin expands and contracts, the first and second wires 51 and 52 will not be pulled, so that breakage of the first and second wires 51 and 52 can be prevented.

Since the extended portions 51*a*, 51*b*, 52*a*, and 52*b* are positioned at the outer recesses 34*a* and 34*b*, which are more recessed than the mounting surfaces 32*a* and 32*b*, the probability that the extended portions 51*a*, 51*b*, 52*a*, and 52*b* will come into contact with a substrate or the like at the time of mounting is reduced, so that occurrence of breakage of the extended portions 51*a*, 51*b*, 52*a*, and 52*b* can be suppressed.

In addition, by covering the electrodes 36*a* and 36*b* with the Cu plating layer 72, the Ni plating layer 73, and the Sn plating layer 74 in this order, the bonding strength between the electrodes 36*a* and 36*b* and a substrate (lands of a substrate) when the coil component 10 is mounted onto the substrate, is improved because there is the Sn plating layer 74 having favorable wettability. In the case where only tin plating is performed on the Ag layer 71, Sn melts, and the Ag layer 71 is exposed. As a result, Ag ion migration occurs between the two electrodes 36*a* and 36*b*, which in turn increase the risk of a short-circuit. Thus, the electrodes 36*a* and 36*b* are covered with the Ni plating layer 73, so that an advantageous effect of preventing movement of Ag is obtained, and accordingly, a short-circuit such as that mentioned above can be suppressed. Here, Ni contained in the Ni plating layer 73 has high residual stress, and thus, there is a possibility that the Ag layer 71, which is included in the electrodes 36*a* and 36*b*, will be separated from the drum core 11. Accordingly, the Cu plating layer 72, which is relatively soft, is interposed between the Ni plating layer 73 and the Ag layer 71 included in the electrodes 36*a* and 36*b*, so that the stress can be reduced. In addition, the coil component 10 has the spaces S1 and S2 formed at the ridge line portions 31*h* and 31*i* of the flange portions 31 and the spaces S3 and S4 formed at the ridge line portions 41*a* and 41*b* of the plate core 41, so that the adhesive can accumulate in the spaces S1, S2, S3, and S4. As a result of the adhesive accumulating in the spaces S1, S2, S3, and S4, the influence of the adhesive on the external dimensions of the coil component 10 is reduced, and impairment of the exterior shape of the coil component 10 is suppressed while unintentional increase in the size of the coil component 10 is suppressed.

As described above, according to the first embodiment, the following advantageous effects can be obtained.

(1) The flange portions 31 have the slopes 35 that guide the extended portions 51*b* and 52*b* to the electrodes 36*b*, so that deformation of the wires 51 and 52 (the extended portions 51*b* and 52*b*) is suppressed, and occurrence of breakage of the wires 51 and 52 can be suppressed.

(2) The pair of flange portions 31 each have one of the slopes 35, so that deformation of the extended portions 51*b* and 52*b* of the first and second wires 51 and 52, which are connected to the electrodes 36*b* of the flange portions 31, are suppressed, and the occurrence of breakage of the wires 51 and 52 can be suppressed.

(3) When viewed in the lengthwise direction Ld, which is the juxtaposition direction of the flange portions 31, the first and second wires 51 and 52 are hidden by the main surfaces 31*a* that are opposite to the main surfaces 31*b*, which are the facing surfaces of the flange portions 31, so that, for example, the occurrence of a situation where, when a resin or the like is molded around the periphery of the coil component 10 after the coil component 10 has been mounted on a substrate, the mold resin enters from the side of the flange portions 31 and reaches the first and second wires 51 and 52 is suppressed. Here, for example, if the mold resin reaches the first and second wires 51 and 52, there is a possibility that the first and second wires 51 and 52 will be pulled as a result of the mold resin expanding and contracting due to thermal shock, which in turn results in breakage of the first and second wires 51 and 52. Therefore, as described above, by reducing the probability of the mold resin reaching the first and second wires 51 and 52, the occurrence of breakage of the wires 51 and 52 is suppressed.

(4) When viewed in the widthwise direction Wd that is a direction perpendicular to the lengthwise direction Ld, which is the juxtaposition direction of the flange portions 31, and to the heightwise direction Td, which is the direction in which the electrodes 36*a* and 36*b* are oriented, the slopes 35 are hidden, so that the exposure of the wires 51 and 52 (the extended portions 51*b* and 52*b*) in the same direction is reduced.

(5) The extended portions 51*b* and 52*b* are linearly arranged along the slopes 35, so that deformation and the like of the extended portions 51*b* and 52*b* do not occur, and occurrence of breakage of the wires 51 and 52 (the extended portions 51*b* and 52*b*) can be suppressed.

(6) The inclination angle of each of the slopes 35 is set to about 5 degrees or larger and about 20 degrees or smaller, so that separation of the wires 51 and 52 from the slopes 35 can be suppressed, and the load that is applied to the wires 51 and 52 can be reduced.

(7) The electrodes 36*a* and 36*b* are covered with the Cu plating layer 72, the Ni plating layer 73, and the Sn plating layer 74 in this order, and the Cu plating layer 72, which is relatively soft, is interposed between the Ni plating layer 73 and the electrodes 36*a* and 36*b* (the Ag layer 71), so that the stress can be reduced.

(8) The extended portions 51*a*, 51*b*, 52*a*, and 52*b* of the wires 51 and 52 are in contact with the Cu plating layer 72. In addition, as in the first embodiment, even if so-called Cu leaching occurs as a result of performing thermocompression bonding when the extended portions 51*a*, 51*b*, 52*a*, and 52*b* are electrically connected to the electrodes 36*a* and 36*b*, Cu is supplied from the Cu plating layer 72, and thus, decrease in the thickness of each of the wires 51 and 52 is suppressed. This can contribute to improvement of the bonded state of each of the wires 51 and 52.

(9) The thickness of each of the plating layers is set within a range of about 1 μm to about 10 μm, so that the wires 51 and 52 can be strongly press-bonded.

(10) The extended portions 51*a*, 51*b*, 52*a*, and 52*b* of the wires 51 and 52 extend to the main surfaces 31*a* and the side surfaces 31*c* and 31*d* of the flange portions 31, so that the probability of the end portions of the extended portions 51*a*, 51*b*, 52*a*, and 52*b* coming into contact with the Sn plating layer 74 can be reduced. Therefore, Cu contained in the end portions (the portions that do not come into contact with the Sn plating layer 74) of the extended portions 51*a*, 51*b*, 52*a*, and 52*b* can be supplied to the extended portions 51*a*, 51*b*, 52*a*, and 52*b* that are press-bonded.

(11) The spaces S1, S2, S3, and S4 serving as the accumulation portions in which the adhesive accumulates are formed, so that, even in the case where the adhesive tries to flow out to the outside when the plate core 41 and the drum core 11 are bonded and fixed to each other, the adhesive can accumulate in the spaces S1, S2, S3, and S4 formed at the ridge line portions 31*h*, 31*i*, 41*a*, and 41*b*. Therefore, the probability that the adhesive will overflow from the external dimensions of the plate core 41 and the drum core 11 can be reduced, and impairment of the exterior shape of the coil component 10 can be suppressed while unintentional increase in the size of the coil component 10 can be suppressed.

(12) The length dimension L4 of the plate core 41 is set to be longer than the length dimension L1 of each of the flange portions 31, so that, even in the case where contact positions at which the plate core 41 and the flange portions 31 are in contact with each other are displaced in the lengthwise direction Ld, the plate core 41 and the flange portions 31 can be reliably brought into contact with each other, and variations in the L value can be reduced.

(13) The width dimension W3 of the plate core 41 is set to be longer than the width dimension W1 of each of the flange portions 31, so that, even in the case where contact positions at which the plate core 41 and the flange portions 31 are in contact with each other are displaced in the widthwise direction Wd, increase in the size of the coil component 10 as a result of the flange portions 31 projecting outward from the plate core 41 can be suppressed. In addition, the plate core 41 and the flange portions 31 can be reliably brought into contact with each other, and variations in the L value can be reduced.

(14) The pair of flange portions 31 have the spaces S1 and S2 serving as the accumulation portions, and the plate core 41 has the spaces S3 and S4 serving as the accumulation portions, so that the adhesive can accumulate in the spaces S1 to S4 of the flange portions 31 and the plate core 41.

(15) Each of the accumulation regions Ar1 and Ar3 of the spaces S1 and S2 of the flange portions 31 is larger than each of the accumulation regions Ar2 and Ar4 of the spaces S3 and S4 of the plate core 41, so that a large amount of the adhesive can flow toward the flange portions 31. In addition, as described above, the plate core 41 has a length larger than that of each of the flange portions 31 and a width larger than that of each of flange portions 31, so that the flange portions 31 are positioned relatively inside, and thus, even if a large amount of the adhesive flows toward the flange portions 31, increase in the external dimensions of the plate core 41 can be suppressed.

(16) The ridge line portions 41*a* and 41*b* of the plate core 41 each have a substantially recessed shape, so that unintentional increase in the size of the coil component 10 can be suppressed.

(17) The radius of curvature of each of the ridge line portions 31*h* and 31*i* is set to about 30 μm or more, so that occurrence of leakage of the adhesive can be sufficiently suppressed, and the radius of curvature of each of the ridge line portions 31*h* and 31*i* is set to about 100 μm or less, so that the bonding strength between the flange portions 31 and the plate core 41 can be ensured.

Second Embodiment

A second embodiment of the present disclosure will be described below with reference to FIG. 8 to FIG. 10. In the following description, a difference between the second embodiment and the first embodiment will be mainly described.

Figure 8:
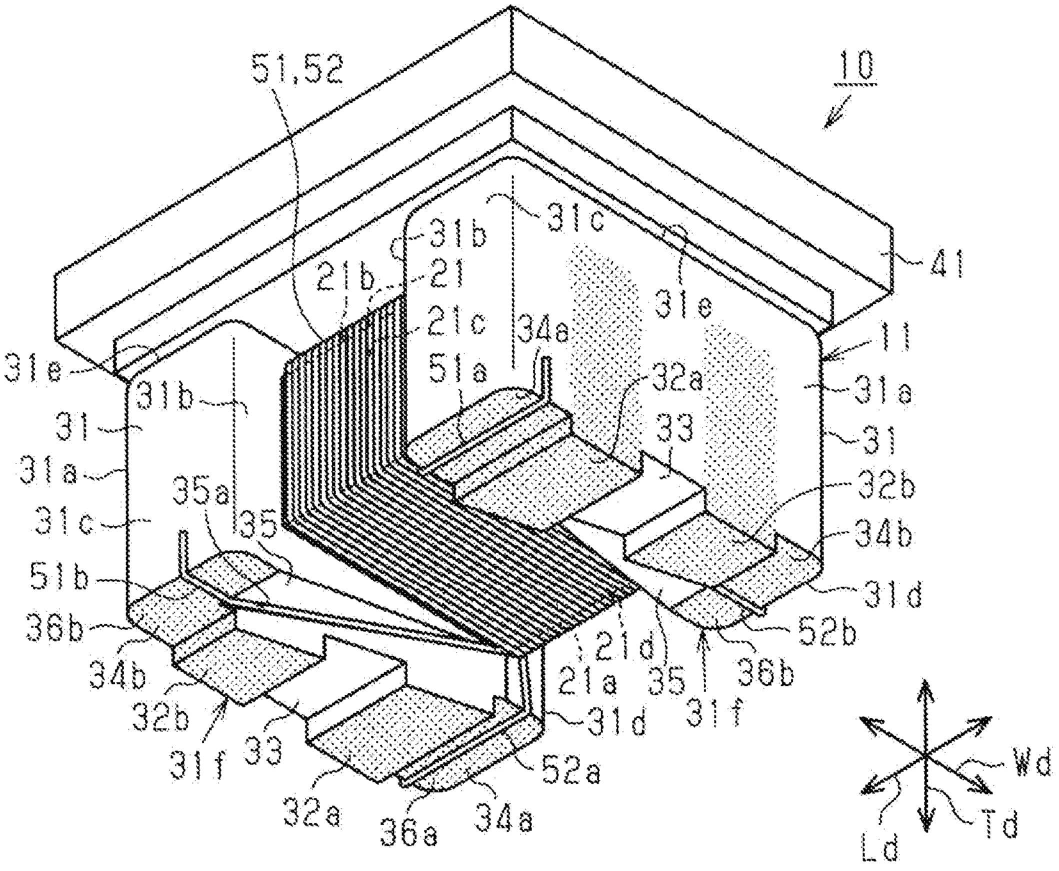
FIG. 8 is a perspective view of a coil component according to a second embodiment.
Figure 9:
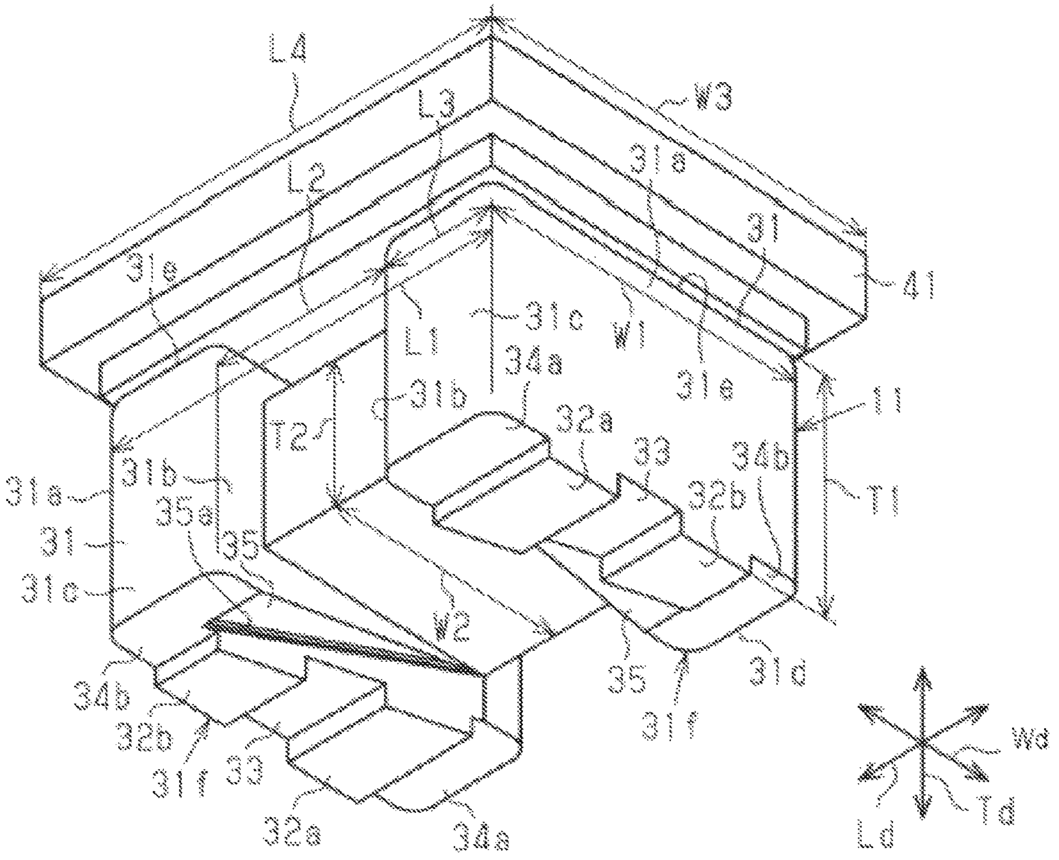
FIG. 9 is a perspective view of a drum core according to the second embodiment.

As illustrated in FIG. 8 and FIG. 9, the difference between the second embodiment and the first embodiment is that the drum core 11 of the coil component 10 according to the second embodiment has grooves 35*a* formed in the slopes 35.

Figure 10:
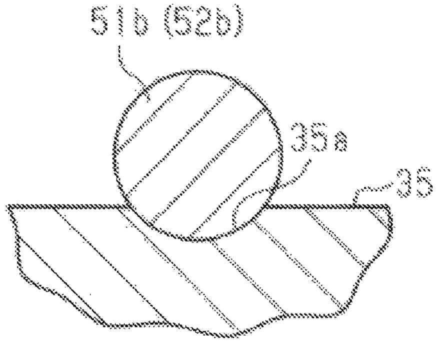
FIG. 10 is a cross-sectional view illustrating a relationship between a slope and a coil according to the second embodiment.

As illustrated in FIG. 8 to FIG. 10, the grooves 35*a* formed in the slopes 35 each have a substantially semicircular cross-sectional shape that enables the extended portions 51*b* and 52*b* of the first and second wires 51 and 52 to be partially fitted into the grooves 35*a*. As a result, displacement of the extended portions 51*b* and 52*b* is suppressed, and the extended portions 51*b* and 52*b* can be reliably guided. Each of the grooves 35*a* has a depth that is one third or more of the diameter of each of the first and second wires 51 and 52, and it is further preferable that the depth of each of the grooves 35*a* be one-half or more of the diameter of each of the first and second wires 51 and 52. Note that, in the second embodiment, the inclination angle of each of the slopes 35 is set within a range of about 5 degrees or larger to about 20 degrees or smaller with respect to the main surface 21*a* of the winding core portion 21 in the widthwise direction Wd, and it is particularly preferable that the inclination angle of each of the slopes 35 be set within a range of about 10 degrees or larger to about 15 degrees or smaller. In FIG. 8 and FIG. 9, the inclination angle of each of the slopes 35 is set to about 10 degrees. For example, a wire having a diameter within a range of about 15 μm to about 80 μm can be used as each of the first and second wires 51 and 52, and in the second embodiment, for example, covered electric wires each having a diameter of about 30 μm are used.

Operation of the above-described coil component 10 will now be described.

In the coil component 10 according to the second embodiment, the grooves 35*a* along which the extended portions 51*b* and 52*b* of the first and second wires 51 and 52 extend are formed in the slopes 35.

As described above, according to the second embodiment, the following advantageous effects can be obtained in addition to the advantageous effects (1) to (17) of the first embodiment.

(18) The grooves 35*a* into which the extended portions 51*b* and 52*b* are fitted are formed in the slopes 35, so that the extended portions 51*b* and 52*b* are more reliably guided, thereby suppressing deformation of the extended portions 51*b* and 52*b*, and occurrence of breakage of the wires 51 and 52 (the extended portions 51*b* and 52*b*) can be suppressed.

Third Embodiment

A third embodiment of the present disclosure will be described with reference to FIG. 11 and FIG. 12. In the following description, a difference between the third embodiment and each of the first and second embodiments will be mainly described.

Figure 11:
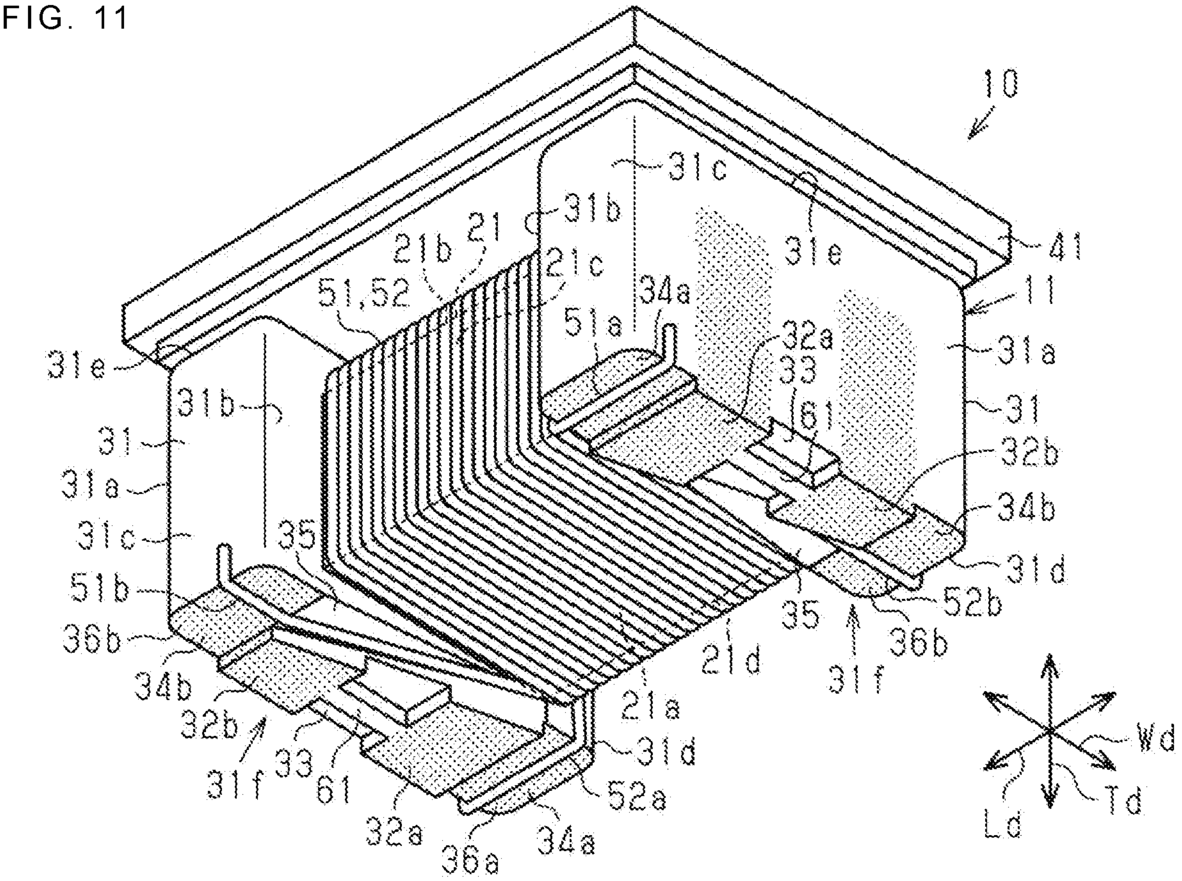
FIG. 11 is a perspective view of a coil component according to a third embodiment.
Figure 12:
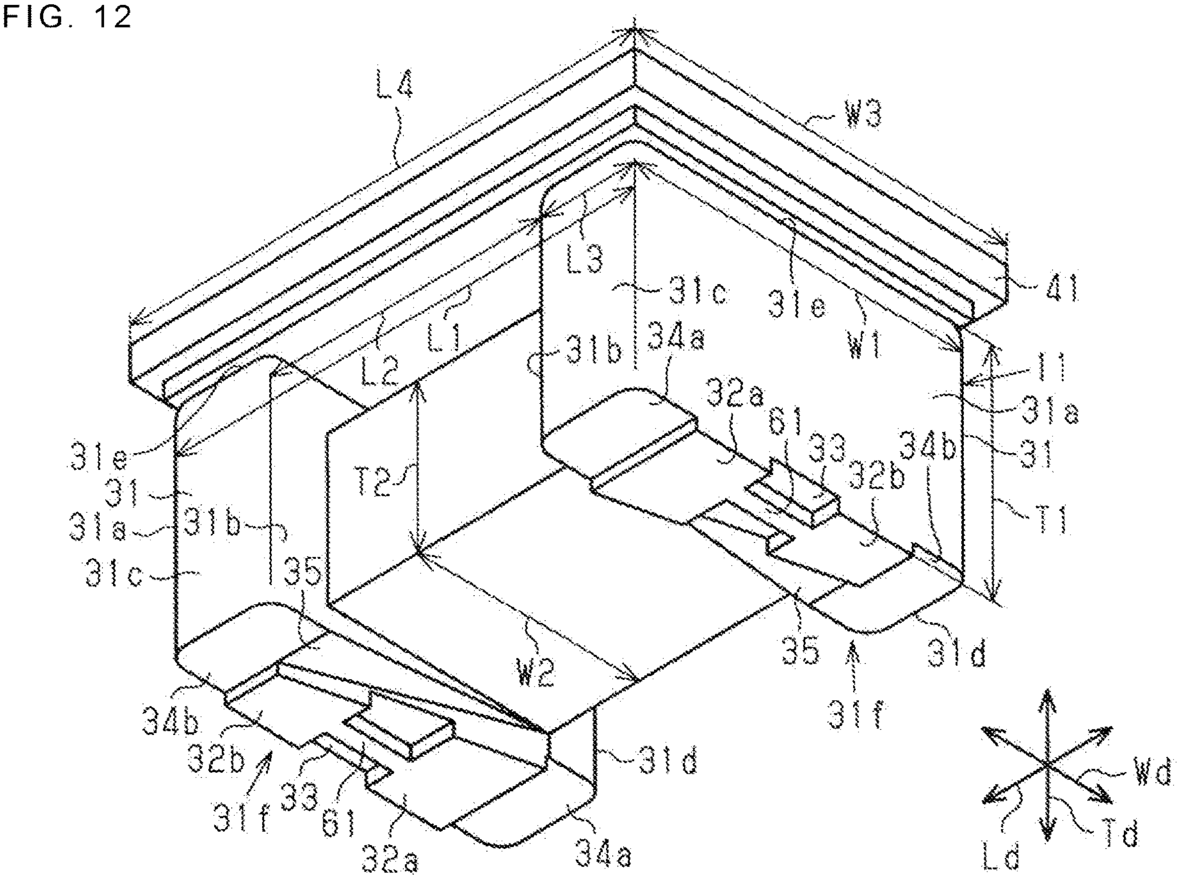
FIG. 12 is a perspective view of a drum core according to the third embodiment.

As illustrated in FIG. 11 and FIG. 12, the difference between the third embodiment and each of the first and second embodiments is that the drum core 11 of the coil component 10 according to the third embodiment includes wall portions 61 that are formed at the center recesses 33 of the flange portions 31 so as to be flush with the mounting surfaces 32*a* and 32*b*. Each of the wall portions 61 is formed at one of the center recesses 33 so as to connect the corresponding mounting surfaces 32*a* and 32*b* to each other. As a result, the probability of a resin entering from the center recesses 33 when a molding operation is performed using the resin or the like so as to provide an insulating coating over the entire coil component 10 or the entire substrate can be reduced. The distance from the mounting surfaces 32*a* and 32*b* of the drum core 11 to the main surface 21*a* of the winding core portion 21 is set to about 0.1 mm to about 0.5 mm.

The angle of each of the slopes 35 of the drum core 11, which has the above-described configuration, is set within a range of about 5 degrees or larger to about 20 degrees or smaller (i.e., from about 5 degrees to about 20 degrees) with respect to the main surface 21*a* of the winding core portion 21 in the widthwise direction Wd, and it is particularly preferable that the angle of each of the slopes 35 be set within a range of about 10 degrees or larger to about 15 degrees or smaller. Note that, in FIG. 11 and FIG. 12, the inclination angle of each of the slopes 35 is set to about 5.5 degrees.

As described above, according to the third embodiment, the following advantageous effects can be obtained in addition to the advantageous effects (1) to (18) of the first and second embodiments.

(19) The wall portions 61 are formed at the center recesses 33 so as to connect the mounting surfaces 32*a* and 32*b* to each other. As a result, the probability of a resin entering from the center recesses 33 when a molding operation is performed using the resin or the like so as to provide an insulating coating over the entire coil component 10 or the entire substrate can be reduced. Therefore, the influence of the resin on the wires 51 and 52 (the extended portions 51*b* and 52*b*) can be reduced, so that occurrence of breakage of the wires 51 and 52 can be suppressed.

Note that the above-described embodiments may be implemented as follows.

In the above-described embodiments, although the pair of flange portions 31 each have one of the slopes 35, a configuration in which only one of the pair of flange portions 31 has a slope 35 may be employed.

In the above-described embodiments, although each of the slopes 35 is formed in a shape having a width that gradually increases from the side of the winding core portion 21 to the side of the corresponding flange portion 31, the present disclosure is not limited to this configuration. For example, each of the slopes 35 may have a uniform width extending from the side of the winding core portion 21 to the side of the corresponding flange portion 31, or each of the slopes 35 may be formed in a shape having a width that gradually decreases from the side of the winding core portion 21 to the side of the corresponding flange portion 31.

In the above-described embodiments, although each of the slopes 35 is an inclined surface that has a substantially linear shape, each of the slopes 35 may be an inclined surface having a substantially curved shape. Note that the inclination angle of each of the slopes 35 in the case where the slope 35 is curved upward so as to have a substantially protruding shape and the inclination angle of each of the slopes 35 in the case where the slope 35 is curved downward so as to have a substantially recessed shape are each the angle formed by connecting the uppermost point and the lowermost point of the slope 35. Even in the case where each of the slopes 35 is formed in a substantially curved shape as mentioned above, as in the above-described embodiments, the inclination angle of each of the slopes 35 is set within a range of about 5 degrees or larger to about 20 degrees or smaller, and it is particularly preferable that the inclination angle of each of the slopes 35 be set within a range of about 10 degrees or larger to about 15 degrees or smaller (i.e., from about 10 degrees to about 15 degrees).

Figure 13:
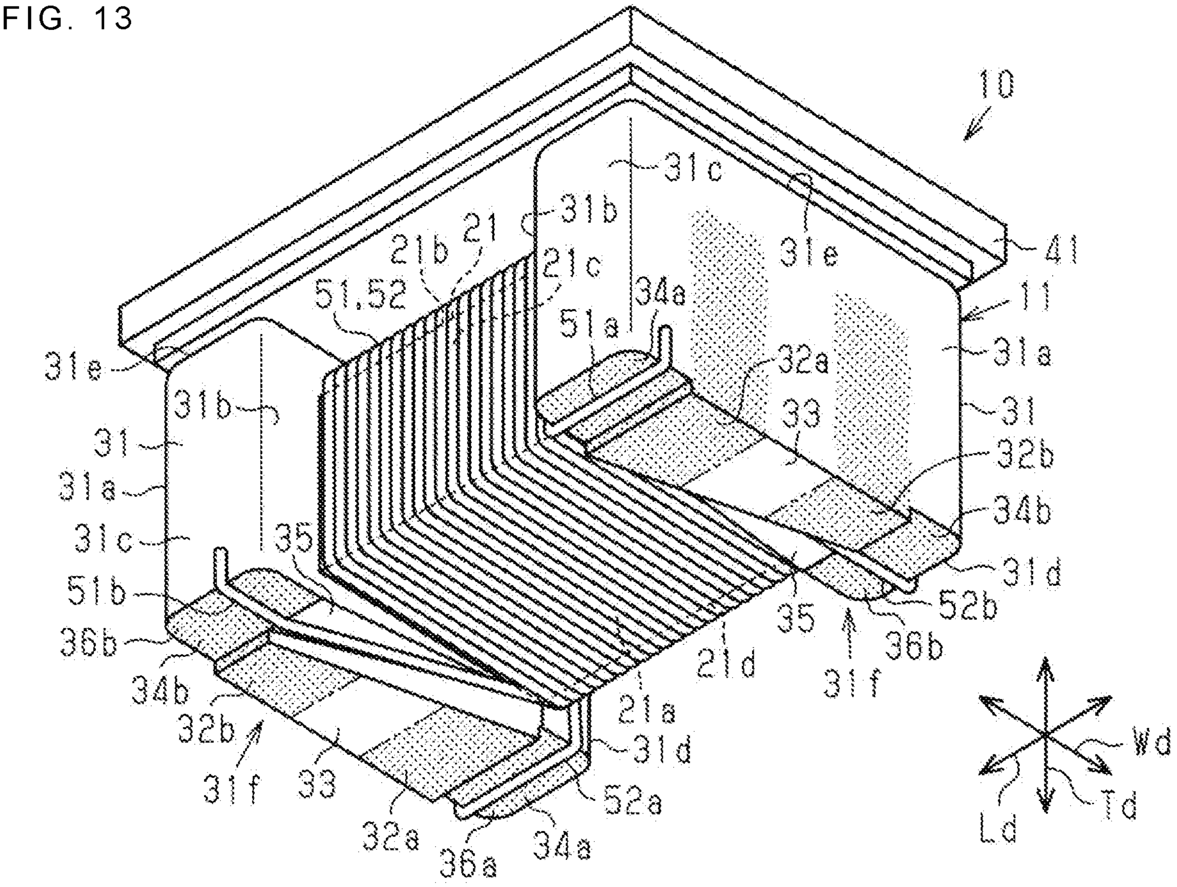
FIG. 13 is a perspective view of a coil component according to a modification.

In the above-described third embodiment, although the wall portions 61 are provided at the center recesses 33 such that each of the wall portions 61 is flush with the corresponding mounting surfaces 32*a* and 32*b*, the present disclosure is not limited to this configuration. For example, as illustrated in FIG. 13, a configuration in which the center recesses 33 are not formed may be employed. Even with such a configuration, an advantageous effect similar to the advantageous effect (6) can be obtained.

In the above-described embodiments, although the length dimension L4 of the plate core 41 is set to be longer than the length dimension L1 of the drum core 11, the present disclosure is not limited to this configuration. For example, a configuration in which the length dimension L4 of the plate core 41 and the length dimension L1 of the drum core 11 are equal to each other or a configuration in which the length dimension L1 of the drum core 11 is longer than the length dimension L4 of the plate core 41 may be employed.

In the above-described embodiments, although the width dimension W3 of the plate core 41 is set to be longer than the width dimension W1 of each of the flange portions 31 of the drum core 11, the present disclosure is not limited to this configuration. For example, a configuration in which the width dimension W3 of the plate core 41 and the width dimension W1 of each of the flange portions 31 of the drum core 11 are equal to each other or a configuration in which the width dimension W1 of the drum core 11 is longer than the width dimension W3 of the plate core 41 may be employed.

In the above-described embodiments, although the plating treatments are performed in the order of the Cu plating layer 72, the Ni plating layer 73, and the Sn plating layer 74 on the Ag layer 71, which is included in the electrodes 36*a* and 36*b*, a configuration in which an additional intermediate Cu plating layer is provided may be employed.

Figure 14:
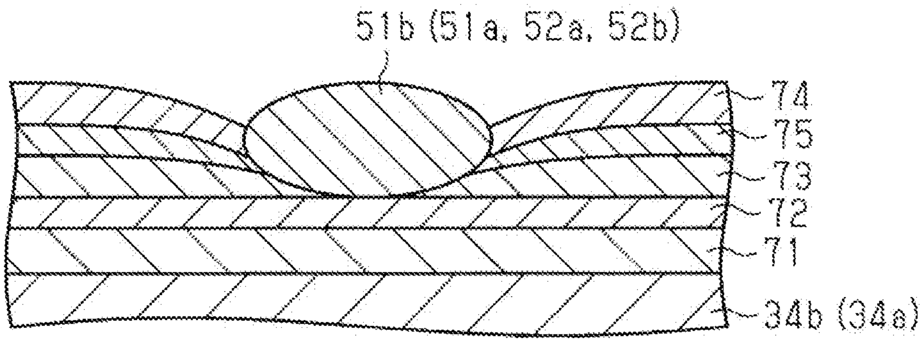
FIG. 14 is a cross-sectional view illustrating a plating structure of flange portions of a drum core according to another modification.

As illustrated in FIG. 14, an intermediate Cu plating layer 75 is interposed between the Ni plating layer 73 and the Sn plating layer 74. With such a configuration, the wires come into contact with Cu with higher certainty, and thus, decrease in the thickness of each of the wires can be suppressed.

In the above-described embodiments, although each of the ridge line portions 41*a* and 41*b* of the plate core 41 is formed so as to have a substantially recessed shape, the present disclosure is not limited to this configuration. For example, each of the ridge line portions 41*a* and 41*b* may be formed in a substantially curved-surface shape or a substantially chamfered shape.

The above-described embodiments and the above-described modifications may be suitably combined with one another.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A common-mode choke coil comprising:

a core that includes a winding core portion and a pair of flange portions formed at ends of the winding core portion;

electrodes that are included on a side of the pair of flange portions; and first and second wires that are wound around the winding core portion and that include extended portions electrically connected to the electrodes on the side of the pair of flange portions, wherein the flange portions are continuous with the winding core portion and have slopes each of which guides a specific one of the extended portions to a specific one of the electrodes, the side of the pair of flange portions includes a pair of mounting surfaces that are spaced apart from each other and a pair of outer recesses that are spaced apart from each other with the pair of mounting surfaces therebetween, the outer recesses each being adjacent to a respective mounting surface, the mounting surfaces project further in a heightwise direction with respect to the outer recesses, and each respective outer recess is adjacent to a side surface of the respective flange portion in a widthwise direction.

2. The common-mode choke coil according to claim 1, wherein the pair of flange portions each have one of the slopes.

3. The common-mode choke coil according to claim 2, wherein facing surfaces of the pair of flange portions that face each other have the slopes, and when viewed in a direction in which the pair of flange portions are arranged, the first and second wires are hidden by end surfaces of the pair of flange portions that are opposite to the facing surfaces of the pair of flange portions.

4. The common-mode choke coil according to claim 2, wherein the slopes are hidden when viewed in a direction that is perpendicular to the direction in which the pair of flange portions are arranged and that is parallel to a mounting surface.

5. The common-mode choke coil according to claim 2, wherein the extended portions are shaped so as to follow shapes of the slopes.

6. The common-mode choke coil according to claim 2, wherein the slopes each have a groove having a substantially semicircular cross-sectional shape and in which one of the extended portions is fitted.

7. The common-mode choke coil according to claim 2, wherein an inclination angle of each of the slopes is within a range of about 5 degrees to about 20 degrees.

8. The common-mode choke coil according to claim 1, wherein facing surfaces of the pair of flange portions that face each other have the slopes, and when viewed in a direction in which the pair of flange portions are arranged, the first and second wires are hidden by end surfaces of the pair of flange portions that are opposite to the facing surfaces of the pair of flange portions.

9. The common-mode choke coil according to claim 8, wherein the slopes are hidden when viewed in a direction that is perpendicular to the direction in which the pair of flange portions are arranged and that is parallel to a mounting surface.

10. The common-mode choke coil according to claim 8, wherein the extended portions are shaped so as to follow shapes of the slopes.

11. The common-mode choke coil according to claim 8, wherein the slopes each have a groove having a substantially semicircular cross-sectional shape and in which one of the extended portions is fitted.

12. The common-mode choke coil according to claim 8, wherein an inclination angle of each of the slopes is within a range of about 5 degrees to about 20 degrees.

13. The common-mode choke coil according to claim 1, wherein the slopes are hidden when viewed in a direction that is perpendicular to the direction in which the pair of flange portions are arranged and that is parallel to a mounting surface.

14. The common-mode choke coil according to claim 4, wherein the extended portions are shaped so as to follow shapes of the slopes.

15. The common-mode choke coil according to claim 13, wherein the slopes each have a groove having a substantially semicircular cross-sectional shape and in which one of the extended portions is fitted.

16. The common-mode choke coil according to claim 1, wherein the extended portions are shaped so as to follow shapes of the slopes.

17. The common-mode choke coil according to claim 16, wherein the slopes each have a groove having a substantially semicircular cross-sectional shape and in which one of the extended portions is fitted.

18. The common-mode choke coil according to claim 1, wherein the slopes each have a groove having a substantially semicircular cross-sectional shape and in which one of the extended portions is fitted.

19. The common-mode choke coil according to claim 1, wherein an inclination angle of each of the slopes is within a range of about 5 degrees to about 20 degrees.

* * * * *